(12) United States Patent
Qi et al.

(10) Patent No.: US 12,710,823 B2
(45) Date of Patent: Aug. 18, 2026

(54) HAPTICS PANEL AND HAPTICS APPARATUS

(71) Applicants: Beijing BOE Technology Development Co. Ltd., Beijing (CN); BOE Technology Group Co., Ltd., Beijing (CN)

(72) Inventors: Dexing Qi, Beijing (CN); Yongchun Tao, Beijing (CN); Yuju Chen, Beijing (CN); Yingzi Wang, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/997,475

(22) PCT Filed: Apr. 17, 2024

(86) PCT No.: PCT/CN2024/088348
§ 371 (c)(1),
(2) Date: Jan. 21, 2025

(87) PCT Pub. No.: WO2024/244775
PCT Pub. Date: Dec. 5, 2024

(65) Prior Publication Data

US 2026/0056615 A1 Feb. 26, 2026

(30) Foreign Application Priority Data

May 31, 2023 (CN) ......................... 202310636125.2

(51) Int. Cl.
*G06F 3/01* (2006.01)
*G06F 3/041* (2006.01)

(52) U.S. Cl.
CPC .............. *G06F 3/016* (2013.01); *G06F 3/041* (2013.01)

(58) Field of Classification Search
CPC . G06F 3/016; G06F 3/041; G06F 3/01; G06F 30/17; G06F 2119/14
See application file for complete search history.

(56) References Cited

U.S. PATENT DOCUMENTS

2012/0075210 A1* 3/2012 Coni ....................... G06F 3/041 345/173
2016/0091972 A1* 3/2016 Patel ....................... G06F 3/041 345/173
(Continued)

FOREIGN PATENT DOCUMENTS

CN 102214041 A 10/2011
CN 111930237 A * 11/2020 ............ G06F 3/016
(Continued)

*Primary Examiner* — Stacy Khoo
(74) *Attorney, Agent, or Firm* — Workman Nydegger

(57) ABSTRACT

Disclosed in the embodiments of the present disclosure are a haptics panel and a haptics apparatus. By means of rationally designing structural parameters of a supporting structure, the resonance frequency of a haptics substrate is within 100 Hz-300 Hz, such that the haptics effect of the haptics panel based on vibration excited by an exciter in a low-frequency range can be effectively improved by means of using the resonance frequency of the haptics substrate; moreover, by means of rationally designing the structural parameters of the supporting structure and also preventing the supporting structure from buckling under the action of static and dynamic loads, the haptics panel can meet the requirements of a haptic design for a vibration amplitude and an acceleration under the condition that the haptics panel meets a rigid design.

18 Claims, 10 Drawing Sheets

(56) References Cited

U.S. PATENT DOCUMENTS

| | | | | |
|---|---|---|---|---|
| 2017/0148587 | A1* | 5/2017 | Fust | G06F 3/016 |
| 2021/0168231 | A1* | 6/2021 | Baker | H05K 1/189 |

FOREIGN PATENT DOCUMENTS

| | | | |
|---|---|---|---|
| CN | 212586839 | U | 2/2021 |
| CN | 113282162 | A | 8/2021 |
| FR | 3039671 | B1 | 12/2019 |
| JP | 2017004262 | A | 1/2017 |

* cited by examiner

HAPTICS PANEL AND HAPTICS APPARATUS

CROSS-REFERENCE TO RELATED APPLICATIONS

This application is a national phase entry under 35 U.S.C § 371 of International Application No. PCT/CN2024/088348, filed on Apr. 17, 2024, claims priority to Chinese Patent Application No. 202310636125.2, filed on May 31, 2023, in the China National Intellectual Property Administration, with a name "Haptics panel and driving method therefor, and haptics apparatus". The entire disclosure of the above application is incorporated herein by reference.

TECHNICAL FIELD

The present disclosure relates to the technical field of haptics, and in particular to a haptics panel and a haptics apparatus.

BACKGROUND

Haptics is the focus of current technology development. Specifically, haptics enables the terminal to interact with the human body through touch.

SUMMARY

The present disclosure provides a haptics panel and a haptics apparatus, and the specific scheme is as follows.

Some embodiments of the present disclosure provide a haptics panel, including:

- a haptics substrate;
- a supporting substrate arranged opposite to the haptics substrate;
- at least one exciter arranged between the haptics substrate and the supporting substrate, the exciter being configured to drive the haptics substrate to resonate along a horizontal direction of the haptics substrate;
- at least one supporting structure arranged between the haptics substrate and the supporting substrate, wherein one end of the supporting structure is connected to the haptics substrate, and other end of the supporting structure is connected to the supporting substrate;
- structural parameters of the at least one supporting structure satisfy: a resonance frequency of the haptics substrate is within a preset range, and the at least one supporting structure does not buckle under an action of static load and dynamic load.

In some embodiments of the haptics panel, the at least one supporting structure includes:

- a first connection structure fixed to a side of the haptics substrate facing the supporting substrate,
- a second connection structure fixed to a side of the supporting substrate facing the haptics substrate, and
- a supporting beam connecting the first connection structure and the second connection structure;
- the structural parameters of the at least one supporting structure are structural parameters of the supporting beam.

In some embodiments of the haptics panel, the structural parameters of the supporting beam satisfy a following relationship:

$$\frac{\pi^2 EI}{(Kl)^2} > \text{mg}\cos\theta,$$

-continued $$K = (1/n)^\wedge(1/2);$$

E is an elastic modulus of the supporting beam, I is a moment of inertia of a cross section of the supporting beam, l is a height of the supporting beam, m is a mass of the haptics substrate carried by the at least one supporting structure, θ is a degree of the inclination angle of the haptics panel, and n is a constraint coefficient of the supporting beam.

In some embodiments of the haptics panel, n=4, or n=2, or n=0.5.

In some embodiments of the haptics panel, the structural parameters of the supporting beam satisfy a following relationship:

$$100\,\text{Hz} < \frac{1}{2\pi}\sqrt{\frac{3EI}{l^3 * m}} < 300\,\text{Hz};$$

$$\frac{1}{2\pi}\sqrt{\frac{3EI}{l^3 * m}}$$

is the resonance frequency of the haptics substrate, E is an elastic modulus of the supporting beam, I is a moment of inertia of a cross section of the supporting beam, l is a height of the supporting beam, and m is a mass of the haptics substrate carried by the at least one supporting structure.

In some embodiments of the haptics panel, the supporting beam connects centers of the first connection structure and the second connection structure to form the at least one supporting structure which is "I"-shaped.

In some embodiments of the haptics panel, the supporting beam connects ends of the first connection structure and the second connection structure to form the at least one supporting structure which is "U"-shaped. An opening of the at least one supporting structure which is "U"-shaped faces toward a direction parallel to the haptics panel.

In some embodiments of the haptics panel, an opening of the at least one supporting structure which is "U"-shaped is toward a periphery of the haptics panel.

In some embodiments of the haptics panel, orthographic projections of the first connection structure and the second connection structure on the supporting substrate do not overlap, and the supporting beam connects adjacent ends of the first connection structure and the second connection structure to form the at least one supporting structure which is "Z"-shaped.

In some embodiments of the haptics panel, a cross-sectional shape of the supporting beam along a thickness direction of the haptics substrate is a rectangle or a circle.

In some embodiments of the haptics panel, four corners of the haptics substrate each is provided with one supporting structure.

In some embodiments of the haptics panel, a center of the haptics substrate is provided with one supporting structure.

In some embodiments of the haptics panel, any three positions on the haptics substrate are provided with three supporting structures, and the three supporting structures form three vertices of a triangle.

In some embodiments of the haptics panel, two supporting structures in an extension direction of a long side or a short side of the haptics substrate are symmetrically arranged.

In some embodiments, the haptics panel further includes: a third connection structure fixedly connected to the side of the haptics substrate facing the supporting substrate, and a supporting portion fixedly connected to the side of the supporting substrate facing the haptics substrate; orthographic projections of the third connection structure and the supporting portion on the supporting substrate do not overlap; a first gap is provided between the third connection structure and the supporting substrate, a second gap is provided between the supporting portion and the haptics substrate, the exciter is fixed between the third connection structure and the supporting portion, and the exciter is not in contact with the haptics substrate and the supporting substrate.

In some embodiments of the haptics panel, the exciter is fixed to a side of the supporting beam.

In some embodiments of the haptics panel, a material of the supporting structure includes metal or stainless steel.

In some embodiments of the haptics panel, the exciter is a PZT piezoelectric film structure, a piezoelectric ceramic block structure or a linear motor.

In some embodiments, the haptics panel further includes a touch layer located on a side of the haptics substrate facing away from the supporting substrate.

Correspondingly, some embodiments of the present disclosure further provide a haptics apparatus, including the aforementioned haptics panel.

DETAILED DESCRIPTION

Figure 1:
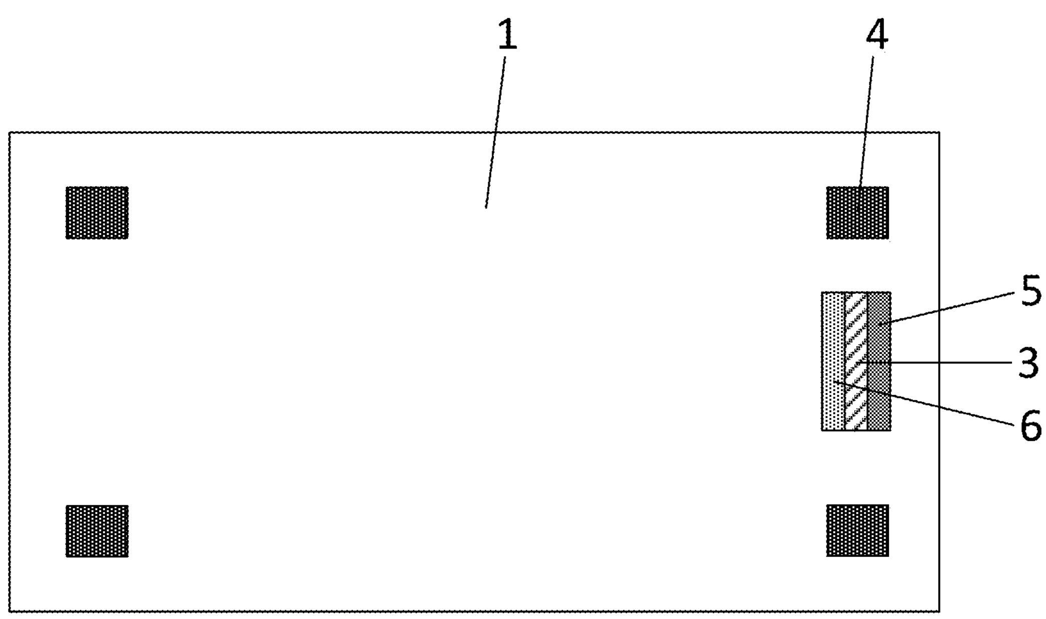
FIG. 1 is a schematic plan view of the first structure of a haptics panel provided in an embodiment of the present disclosure.

In order to make the purpose, technical solution and advantages of the embodiments of the present disclosure clearer, the technical solution of the embodiments of the present disclosure will be clearly and completely described below in conjunction with the drawings of the embodiments of the present disclosure. Obviously, the described embodiments are part of the embodiments of the present disclosure, not all of the embodiments. And in the absence of conflict, the embodiments in the present disclosure and the features in the embodiments can be combined with each other. Based on the described embodiments of the present disclosure, all other embodiments obtained by ordinary technicians in the field without creative work are within the scope of protection of the present disclosure.

Unless otherwise defined, the technical terms or scientific terms used in the present disclosure should be understood by people with ordinary skills in the field to which the present disclosure belongs. "Include" or "comprise" and other similar words used in the present disclosure mean that the elements or objects appearing before the word include the elements or objects listed after the word and their equivalents, without excluding other elements or objects. "Connect" or "connected" and other similar words are not limited to physical or mechanical connections, but may include electrical connections, whether direct or indirect. "Inside", "outside", "upper", "lower", etc., are only used to indicate relative positional relationships. When the absolute position of the described object changes, the relative positional relationship may also change accordingly.

It should be noted that the sizes and shapes of the figures in the accompanying drawings do not reflect the actual proportions, and are only intended to illustrate the present disclosure. The same or similar reference numerals throughout represent the same or similar elements or elements having the same or similar functions.

For vibration-based haptics reproduction devices, the working principle is usually to achieve touch functions such as virtual buttons by pasting piezoelectric sheets, linear motors or piezoelectric films on the haptics substrate and applying pulse excitation. The solution using linear motors is that the mass of the device that can be excited by the linear motors is directly related to the mass block of the linear motors. When the mass of the device is large, the design of the linear motors will be constrained by the size of the mass block, making the device volume, response time, vibration acceleration and displacement unsatisfactory. The solution using piezoelectric sheets can greatly reduce the device volume and response time. However, when the haptics device is large in mass and size, the design of the traditional supporting structure needs to meet the rigidity requirements. At this time, the linear motor and piezoelectric material solutions are difficult to meet the requirements of haptics design for amplitude and acceleration.

Therefore, in the design process of haptics devices, when the device mass and size are large, the supporting structure of the haptics device needs to meet the requirements of both rigid support and haptics design. Overly rigid support is difficult to achieve sufficient amplitude and acceleration to meet the haptics design, while overly soft support is difficult to meet the requirements of structural stability.

Figure 2:
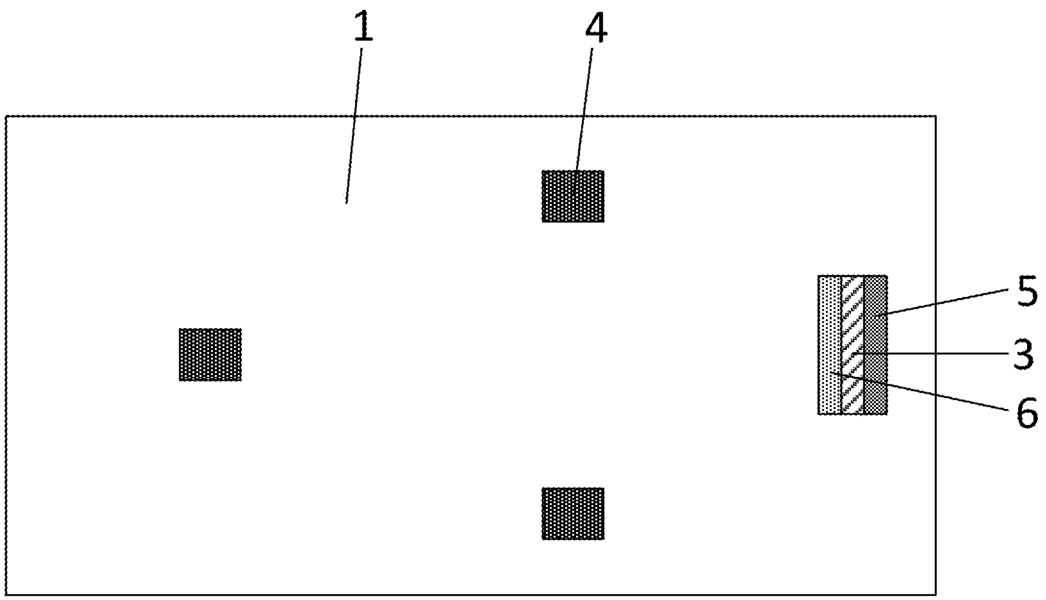
FIG. 2 is a schematic plan view of the second structure of a haptics panel provided in an embodiment of the present disclosure.
Figure 3:
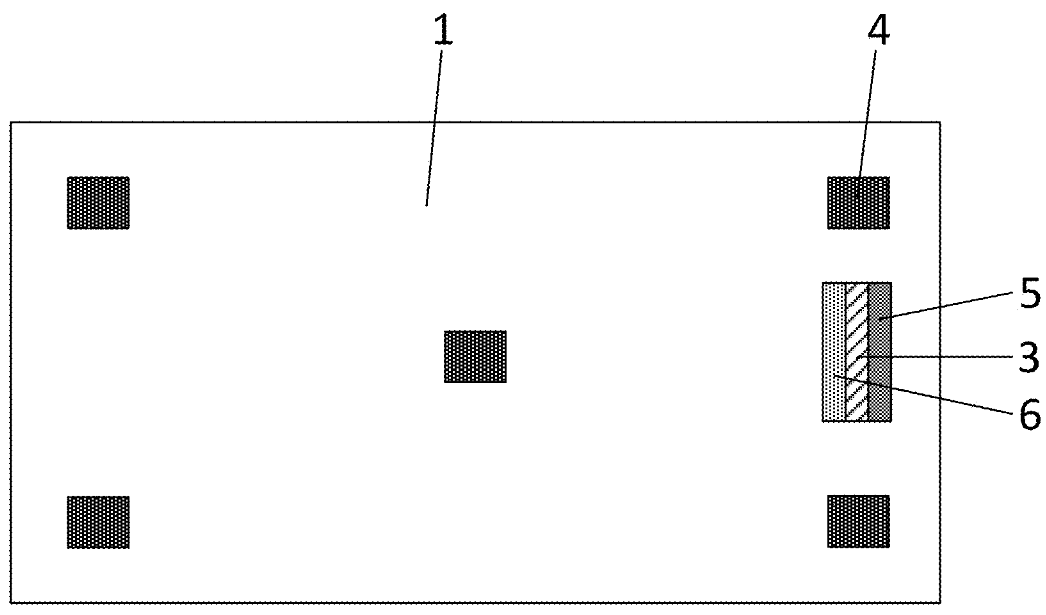
FIG. 3 is a schematic plan view of the third structure of a haptics panel provided in an embodiment of the present disclosure.

In order to realize that the supporting structure of a haptics device with large mass and size can simultaneously meet the requirements of rigid support and haptics design, some embodiments of the present disclosure provide a haptics panel, as shown in FIG. 1 to FIG. 13. FIG. 1 to FIG. 3 are several schematic diagrams of a part of the structure of the haptics panel, and FIG. 4 to FIG. 13 are several cross-sectional views of the haptics panel, which includes:

- a haptics substrate 1;
- a supporting substrate 2 arranged opposite to the haptics substrate 1;
- at least one exciter 3 arranged between the haptics substrate 1 and the supporting substrate 2, the exciter 3 being configured to drive the haptics substrate 1 to resonate along a horizontal direction of the haptics substrate 1;
- at least one supporting structure 4 arranged between the haptics substrate 1 and the supporting substrate 2, one end of the supporting structure 4 is connected to the haptics substrate 1, and the other end of the supporting structure 4 is connected to the supporting substrate 2; structural parameters of the supporting structure 4 satisfy: the resonance frequency of the haptics substrate 1 is within a preset range, and the supporting structure 4 does not buckle under the action of static load and dynamic load.

The above-mentioned haptics panel provided by the embodiments of the present disclosure, makes the resonance frequency of the haptics substrate within a preset range by reasonably designing the structural parameters of the supporting structure, for example, the preset range is within the frequency range (100 Hz to 300 Hz) where the human body is most sensitive to vibration, so that the resonance frequency of the haptics substrate can effectively improve the haptics effect of the haptics panel based on the exciter excitation vibration in the low-frequency range. Further, the supporting structure is made not to buckle under the action of static load and dynamic load at the same time by reasonably designing the structural parameters of the supporting structure, so that the haptics panel can meet the requirements of the haptics design for vibration amplitude and acceleration under the condition of meeting the rigid design. Therefore, the embodiments of the present disclosure can realize that the supporting structure of the haptics panel with large mass and large size can meet the requirements of rigid support and haptics design at the same time.

In specific implementation, in the above-mentioned haptics panel provided in the embodiments of the present disclosure, as shown in FIG. 1 to FIG. 13, the supporting structure 4 includes a first connection structure 41 fixed to a side of the haptics substrate 1 facing the supporting substrate 2, a second connection structure 42 fixed to a side of the supporting substrate 2 facing the haptics substrate 1, and a supporting beam 43 connecting the first connection structure 41 and the second connection structure 42. The structural parameters of the supporting structure 4 are the structural parameters of the supporting beam 43. In this way, by reasonably designing the structural parameters of the supporting beam 43, the resonance frequency of the haptics substrate is within 100 Hz to 300 Hz, and the supporting beam 43 does not buckle under the action of static load and dynamic load.

It should be noted that the embodiments of the present disclosure is described using the frequency range of 100 Hz to 300 Hz, in which the human body is most sensitive to vibration. Of course, in actual situations, the sensitive frequency range of each person's tactile organ will be different (for example, 100 Hz to 600 Hz, etc). The embodiment of the present disclosure designs the structural parameters of the supporting beam based on the actual sensitive frequency range of the human tactile organ.

In specific implementation, in the above-mentioned haptics panel provided in the embodiments of the present disclosure, as shown in FIG. 1 to FIG. 13, the haptics substrate 1 is a substrate that directly contacts with tactile senses such as fingers, and can be a notebook touchpad, a display screen, etc. The exciter 3 can be a PZT piezoelectric film structure, a piezoelectric ceramic block structure, a linear motor, etc. The supporting structure 4 can be a thin sheet structure, and its material can include but is not limited to metal, stainless steel, etc., and the supporting structure 4 mainly serves to connect and support the haptics substrate 1 and the supporting substrate 2.

In some embodiments, the supporting structure and the haptics substrate 1 as well as the supporting structure and the supporting substrate 2 may be fixedly connected by using an adhesive layer (such as optical adhesive, OCA) or the like.

In a specific implementation, in the haptics panel provided in the embodiments of the present disclosure, as shown in FIG. 1 to FIG. 3, the number of the supporting structures 4 can be multiple, which can improve the structural stability between the haptics substrate 1 and the supporting substrate 2.

In a specific implementation, in the above-mentioned haptics panel provided in the embodiment of the present disclosure, as shown in FIG. 1 to FIG. 3, the orthographic projection shape of each supporting structure 4 on the haptics substrate 1 can be a rectangle. The orthographic projection shape of each supporting structure 4 on the haptics substrate 1 can also be a triangle, a circle, a trapezoid or a polygon, etc.

Figure 14:
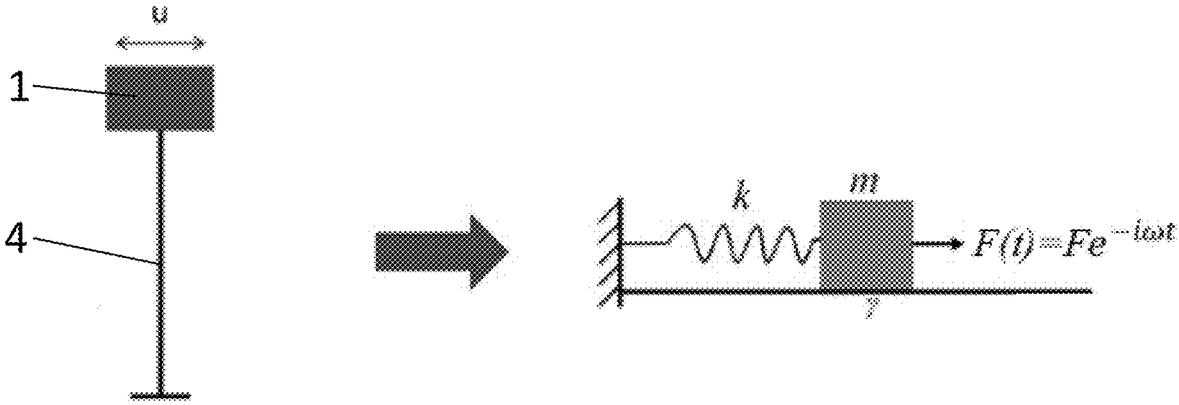
FIG. 14 is a simplified analytical model of the mass of a supporting structure and a haptics substrate supported by the supporting structure according to an embodiment of the present disclosure.

As shown in FIG. 14, which is a simplified analysis model of a supporting structure 4 and the mass (m) of the haptics substrate 1 supported by the supporting structure 4 in the embodiment of the present disclosure. The supporting structure 4 is equivalent to a spring, and the force formula of the supporting structure 4 is $F(t)=Fe^{-i\omega t}$. The motion equation can be listed from the force analysis:

$$m\ddot{x}(t) = -\gamma\dot{x}(t) - kx(t) + Fe^{-i\omega t} \tag{1}$$

$$w_0 = \sqrt{\frac{k}{m}},\ \gamma_0 = \frac{\gamma}{m},$$

then equation (1) can be transformed into:

$$\ddot{x}(t)+\gamma_0\dot{x}(t)+w_0^2x(t)=\frac{F}{m}e^{-i\omega t}. \quad (2)$$

Formula (2) is a non-homogeneous second-order ordinary differential equation. The disclosed embodiment only considers the steady-state solution of Formula (2) and does not consider its transient solution. Therefore, the solution can be set to be: $x(t)=Ne^{-i\omega t}$(3), where N is independent of t. Substituting Formula (3) into Formula (2), can obtain:

$$N=\frac{F}{m(w_0^2-w^2-i\gamma_0 w)}, \quad (4)$$

N is the maximum allowable load. It can be seen that N is related to the frequency w of the driving force, and the form of N is very similar to the Lorentz dielectric function in optics.

The steady-state solution of the above equation (2) is $$x(t)=\frac{F}{m(w_0^2-w^2-i\gamma_0 w)}. \quad (5)$$

Formula (5) is in complex form, and only the real part has physical meaning.

Now the amplitude of the oscillator (exciter) can be obtained:

$$A=|x(t)|=\frac{F}{m\sqrt{(w_0^2-w^2)^2+(\gamma_0 w)^2}}. \quad (6)$$

It can be seen that the amplitude A is related to the frequency w of the driving force. In other words, at different driving force frequencies, the amplitude of the oscillator has different responses, which is the amplitude-frequency response curve.

For example, the number of supporting structures 4 in the haptics panel provided by the embodiments of the present disclosure is $m_s$, and the mass of the haptics substrate 1 is M, then the mass of the haptics substrate 1 carried by one supporting structure 4 is $m=M/m_s$. The spring stiffness k in FIG. 14 is the bending stiffness $$k_l=\frac{3EI}{l^3}$$

of the supporting beam 43 in the supporting structure 4. According to the above theoretical analysis, by adjusting the shape of the cross section of the supporting beam 43 and the length of the supporting beam 43, the resonance characteristics of the haptics substrate 1 can be adjusted, so that the resonance frequency of the haptics substrate 1 is within the tactile sensitive range, and the structural parameters of the supporting beam 43 satisfy the following relationship:

$$100\text{ Hz}<\frac{1}{2\pi}\sqrt{\frac{3EI}{l^3*m}}<300\text{ Hz},$$

$$\frac{1}{2\pi}\sqrt{\frac{3EI}{l^3*m}}$$

is the resonance frequency of the haptics substrate, E is the elastic modulus of the supporting beam, I is the moment of inertia of the cross section of the supporting beam, 1 is the height of the supporting beam, and m is the mass of the haptics substrate carried by one supporting structure.

Therefore, by reasonably designing the structural parameters (E, I, 1) of the supporting beam 43 in the supporting structure 4, the resonance frequency of the haptics substrate 1 is within the frequency range (100 Hz~300 Hz) to which the human body is most sensitive to vibration. In this way, the resonance frequency of the haptics substrate 1 can effectively improve the haptics effect of the haptics panel based on the vibration excitation of the exciter 3 in the low-frequency range.

Figure 15:
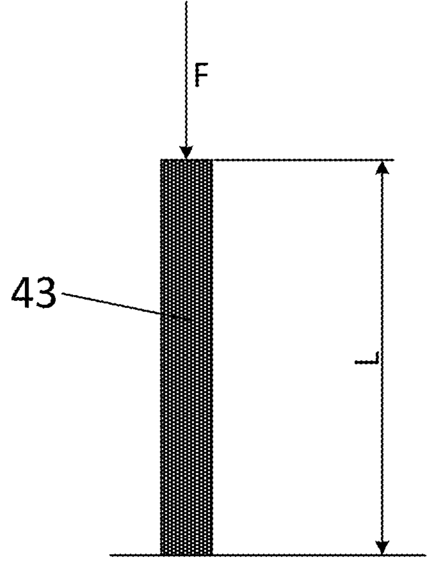
FIG. 15 is a cross-sectional view of a supporting beam (which may be referred to as a long column unit)

In specific implementation, for a haptics panel with a large mass and a large size, its supporting structure 4 needs to be able to meet both rigid support and haptics design requirements. Considering that the mass of the haptics substrate is large, the flexible supporting beam 43 will bend, so it is necessary to put forward requirements for the cross-section, length and number of the flexible supporting beam 43. As shown in FIG. 15, which is a cross-sectional view of the supporting beam 43 (which can be called a long column unit). The long column unit can be analyzed using the Euler column formula: F=nπ^2EI/L^2. F is the maximum load allowed by the supporting beam 43 (N), n is the constraint coefficient of the column unit, E is the elastic modulus of the supporting beam 43 (Pa (N/m^2)), and L is the length of the column unit (meter).

Figure 16A:
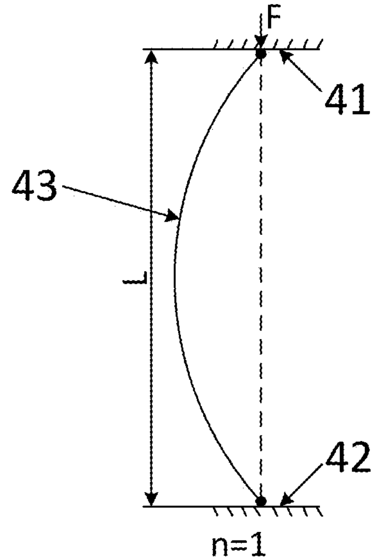
FIG. 16A is a schematic diagram of the connection between the supporting beam and the first connection structure (first end) and the connection between the supporting beam and the second connection structure (second end)
Figure 16B:
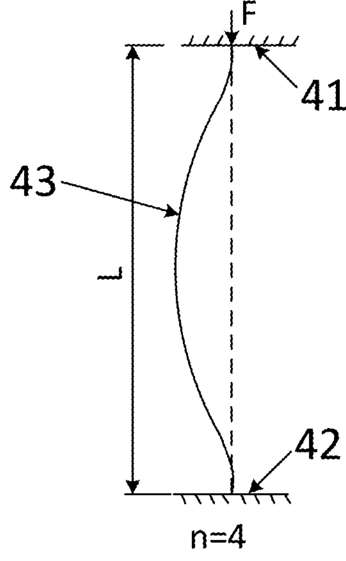
FIG. 16B is another schematic diagram of the connection between the supporting beam and the first connection structure (first end) and the connection between the supporting beam and the second connection structure (second end)
Figure 16C:
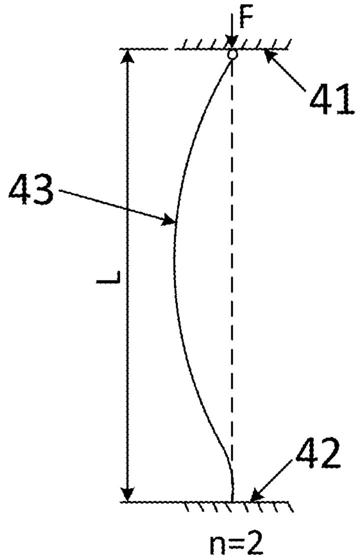
FIG. 16C is another schematic diagram of the connection between the supporting beam and the first connection structure (first end) and the connection between the supporting beam and the second connection structure (second end)
Figure 16D:
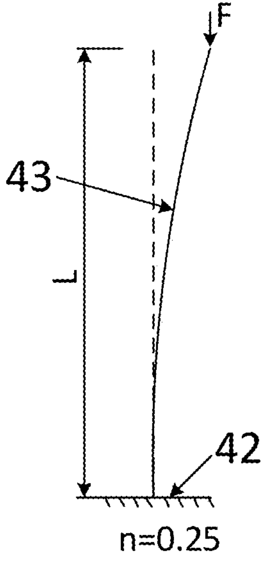
FIG. 16D is yet another schematic diagram of the connection between the supporting beam and the first connection structure (first end) and the connection between the supporting beam and the second connection structure (second end)

As shown in FIG. 16A to FIG. 16D, which are schematic diagrams of the connection between the supporting beam 43 and the first connection structure 41 (first end) and the connection between the supporting beam 43 and the second connection structure 42 (second end). FIG. 16A shows that both the first end and the second end are rotatable, corresponding to n=1. FIG. 16B shows that both the first end and the second end are fixed, corresponding to n=4. FIG. 16C shows that the second end is fixed and the first end is rotatable, corresponding to n=2. FIG. 16D shows that the second end is fixed and the first end is free, corresponding to n=0.25. Sometimes K is used instead of n to describe the boundary conditions of the supporting beam 43: K=(1/n)^(½). The conversion relationship of K–n is shown in the following table.

| n | 1 | 4 | 2 | 0.25 |
|---|---|---|---|---|
| K | 1 | 0.5 | 0.7 | 2 |

Therefore, the maximum allowable load of the supporting beam 43 can be expressed as:

$$F=\pi\text{^}2EI/(KL)\text{^}2.$$

In order to make the supporting structure 4 meet the rigid support requirements, the structural parameters of the supporting beam 43 need to satisfy the following relationship:

$$\frac{\pi^2EI}{(kl)^2}>\text{mg}\cos\theta,$$

-continued $$K=(1/n)^\wedge(1/2);$$

E is the elastic modulus of the supporting beam, I is the moment of inertia of the cross section of the supporting beam, l is the height of the supporting beam, m is the mass of the haptics substrate carried by one supporting structure, θ is the degree of the inclination angle of the haptics panel, and n is the constraint coefficient of the supporting beam.

In some embodiments, as shown in FIG. 4 to FIG. 13, when the haptics panel is placed horizontally relative to the horizontal plane, the moment of inertia I, elastic modulus E and height l of the cross-section of the supporting beam 43 need to satisfy the following relationship:

$$\frac{\pi^2 EI}{(kl)^2} > \text{mg}.$$

Figure 17:
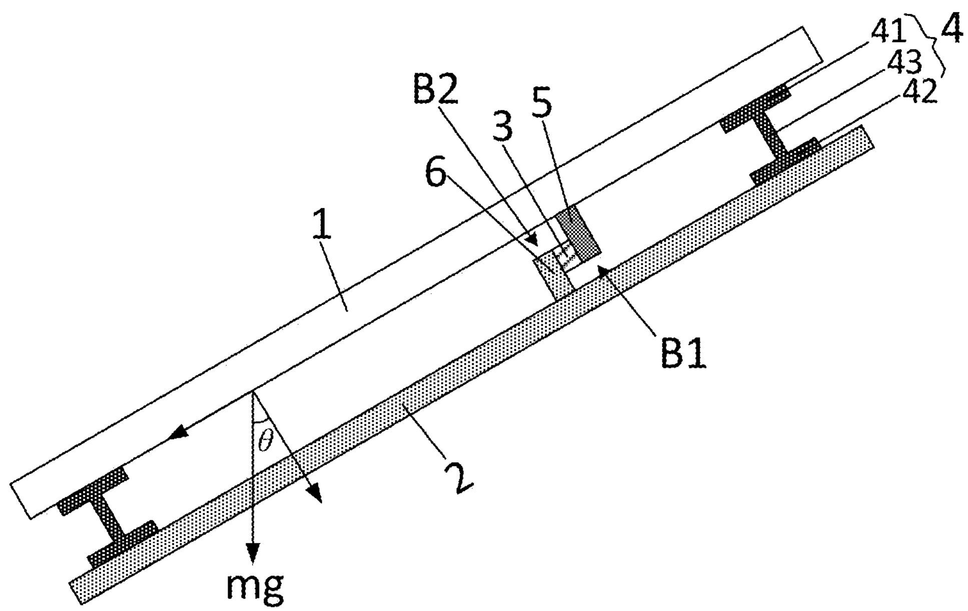
FIG. 17 is a cross-sectional schematic diagram of a haptics panel provided in an embodiment of the present disclosure in which a haptics panel is tilted.

As shown in FIG. 17, when the haptics panel is placed at an angle θ relative to the horizontal plane, the moment of inertia I, elastic modulus E and height l of the cross-section of the supporting beam 43 need to satisfy the following relationship:

$$\frac{\pi^2 EI}{(kl)^2} > \text{mg}\cos\theta.$$

Therefore, by adjusting the elastic modulus of the supporting beam, adjusting the moment of inertia of the cross-section of the supporting beam, and adjusting the height of the supporting beam, the supporting structure 4 can meet the rigid support requirements.

Figure 4:
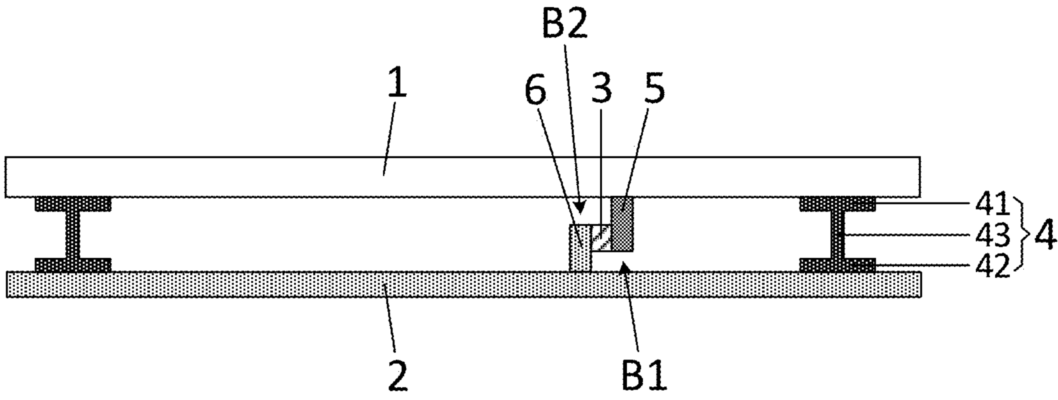
FIG. 4 is a cross-sectional view of the first haptics panel provided by embodiments of the present disclosure.

It should be noted that FIG. 17 takes the structure shown in FIG. 4 as an example to illustrate that the haptics panel is placed tilted relative to the horizontal plane. Of course, FIG. 5 to FIG. 13 may also take the structure shown in FIG. 4 as an example to illustrate that the haptics panel is placed tilted relative to the horizontal plane.

In specific implementation, in the above haptics panel provided in the embodiment of the present disclosure, the constraint coefficient n of the column unit (supporting beam 43) can be selected as n=4, n=2, or n=0.5. In this way, the supporting structure 4 in the haptics panel with large mass and size can meet the rigidity design requirements on the basis of satisfying the resonance frequency of the haptics substrate 1 within the frequency range (100 Hz to 300 Hz) to which the human body is most sensitive to vibration.

In specific implementation, in the haptics panel provided in the embodiment of the present disclosure, as shown in FIG. 1, a supporting structure 4 may be respectively provided at the four corners of the haptics substrate 1, so as to improve the stability of the haptics substrate 1.

In a specific implementation, in order to further improve the stability of the haptics substrate, in the above-mentioned haptics panel provided in the embodiment of the present disclosure, as shown in FIG. 3, a supporting structure 4 can be respectively provided at the four corners of the haptics substrate 1, and a supporting structure 4 is provided at the center position of the haptics substrate 1.

In specific implementation, in the haptics panel provided in the embodiment of the present disclosure, as shown in FIG. 2, a supporting structure 4 is respectively provided at any three positions of the haptics substrate 1, and the three supporting structures 4 form the three vertices of a triangle, so that the haptics substrate 1 can also have a higher stability.

In a specific implementation, in the haptics panel provided in the embodiment of the present disclosure, as shown in FIG. 1 to FIG. 3, the two supporting structures 4 located in the extension direction of the long side or the short side of the haptics substrate 1 can be symmetrically arranged. Of course, all the supporting structures 4 can also be designed asymmetrically, as long as the supporting structures 4 are evenly distributed at various positions of the haptics substrate 1 to ensure the stability of the haptics substrate 1.

In a specific implementation, one, two or more (greater than five) supporting structures 4 may be provided below the haptics substrate 1, and the number of supporting structures 4 may be designed according to actual needs. When designing one or two supporting structures 4, in order to ensure the stability of the structure, it is necessary to reasonably design the connection area between the first connection structure 41 in the supporting structure 4 and the corresponding substrate and the connection area between the second connection structure 42 in the supporting structure 4 and the corresponding substrate.

In specific implementation, the above-mentioned haptics panel provided in the embodiment of the present disclosure, as shown in FIG. 1 to FIG. 8, also includes: a third connection structure 5 fixedly connected to a side of the haptics substrate 1 facing the supporting substrate 2, and a supporting portion 6 fixedly connected to a side of the supporting substrate 2 facing the haptics substrate 1. The orthographic projections of the third connection structure 5 and the supporting portion 6 on the supporting substrate 2 do not overlap, and there is a first gap B1 between the third connection structure 5 and the supporting substrate 2, and there is a second gap B2 between the supporting portion 6 and the haptics substrate 1. The exciter 3 is fixed between the third connection structure 5 and the supporting portion 6, and the exciter 3 is not in contact with the haptics substrate 1 and the supporting substrate 2. In this way, when the excitation signal is loaded to the exciter 3, the exciter 3 is driven by the excitation signal to deform along the horizontal direction of the haptics substrate 1, so as to drive the haptics substrate 1 to resonate (laterally vibrate) along the horizontal direction of the haptics substrate 1, and when the finger slides along the surface of the haptics substrate 1, it has a sense of touch in the horizontal direction.

In specific implementation, in the above-mentioned haptics panel provided in the embodiment of the present disclosure, as shown in FIG. 9 to FIG. 13, the exciter 3 can also be fixed to one side of the supporting beam 43. In this way, the exciter 3 can also drive the haptics substrate 1 to resonate (laterally vibrate) in the horizontal direction under the drive of the excitation signal. This structure directly fixes the exciter 3 to one side of the supporting beam 43, which can reduce the arrangement of the third connection structure 5 and the supporting portion 6. In addition, the cross section at this time is a composite cross section of the cross section of the supporting beam 43 and the cross section of the exciter 3, and the moment of inertia (I) of the cross section in the above formula is the moment of inertia of the composite cross section.

Figure 9:
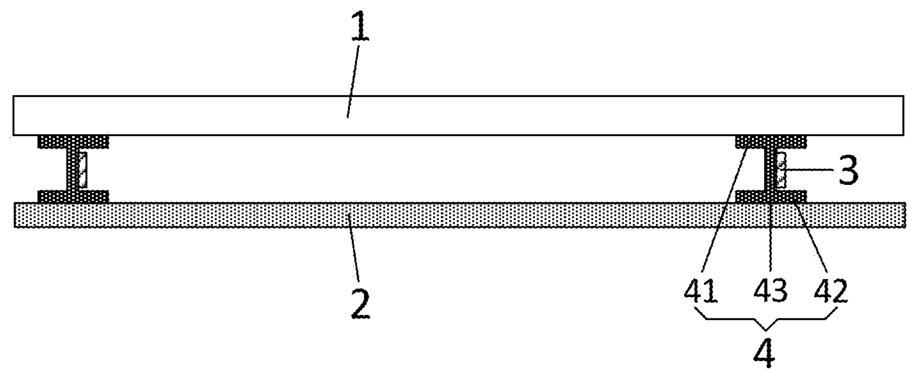
FIG. 9 is a cross-sectional view of the sixth haptics panel provided by embodiments of the present disclosure.

In a possible implementation, in the haptics panel provided in the embodiment of the present disclosure, as shown in FIG. 4 and FIG. 9, the supporting beam 43 connects the center positions of the first connection structure 41 and the second connection structure 42 to form an "I"-shaped supporting structure.

Figure 5:
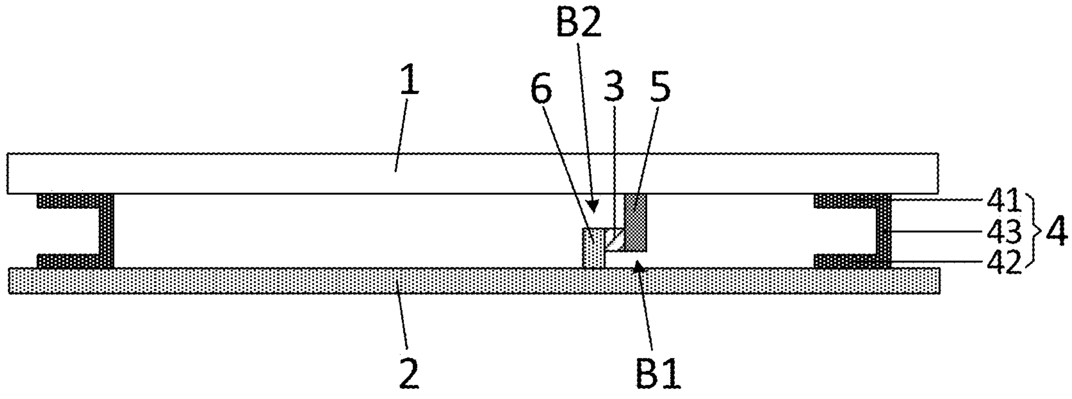
FIG. 5 is a cross-sectional view of the second haptics panel provided by embodiments of the present disclosure.
Figure 6:
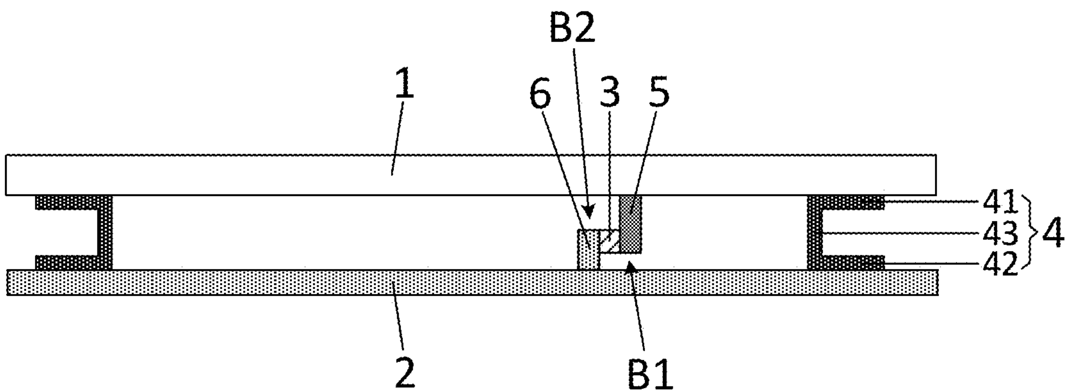
FIG. 6 is a cross-sectional view of the third haptics panel provided by embodiments of the present disclosure.
Figure 7:
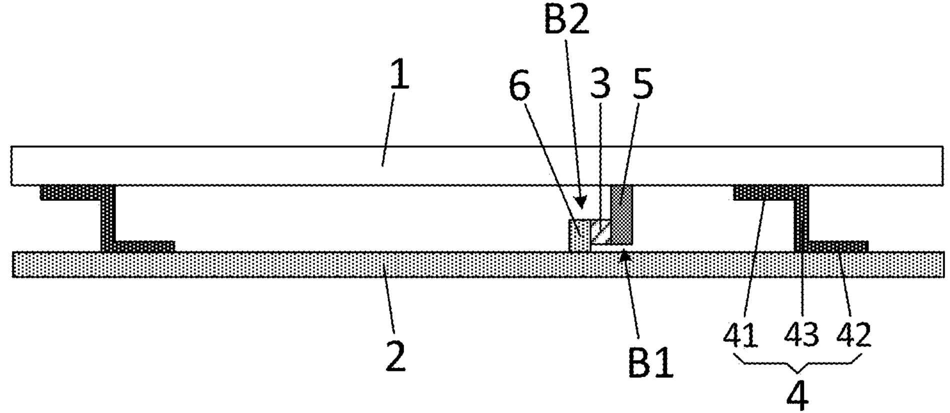
FIG. 7 is a cross-sectional view of the fourth haptics panel provided by embodiments of the present disclosure.
Figure 10:
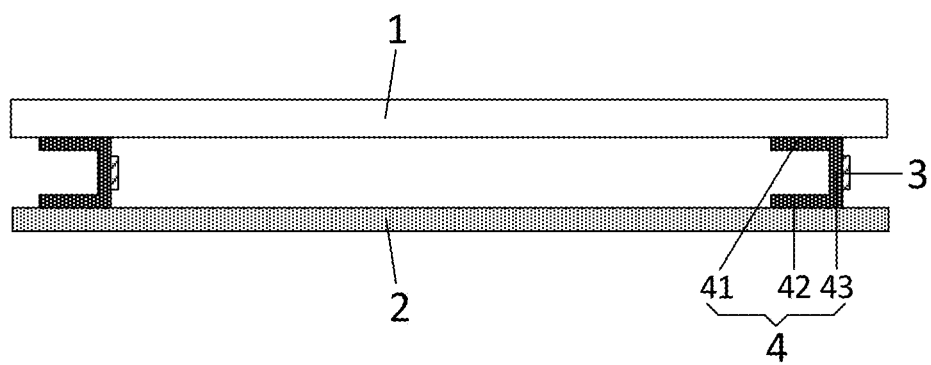
FIG. 10 is a cross-sectional view of the seventh haptics panel provided by embodiments of the present disclosure.
Figure 11:
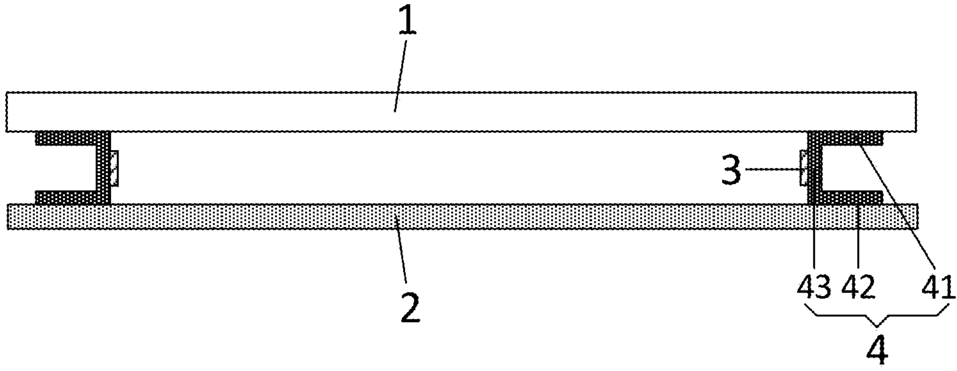
FIG. 11 is a cross-sectional view of the eighth haptics panel provided by embodiments of the present disclosure.
Figure 12:
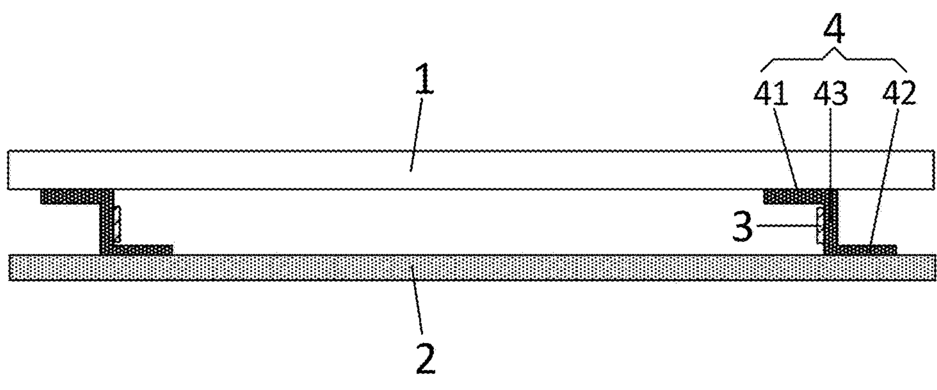
FIG. 12 is a cross-sectional view of the ninth haptics panel provided by embodiments of the present disclosure.

In a possible implementation, in the above-mentioned haptics panel provided in an embodiment of the present disclosure, as shown in FIG. 5, FIG. 6, FIG. 10 and FIG. 11, the supporting beam 43 connects the ends of the first connection structure 41 and the second connection structure 42 to form a supporting structure which is "U"-shaped. Specifically, as shown in FIG. 5 and FIG. 10, the openings of some supporting structures 4 which are "U"-shaped can be oriented toward the inside of the haptics panel, and the openings of other supporting structures 4 which are "U"-shaped can be oriented toward the periphery of the haptics panel. As shown in FIG. 6 and FIG. 11, considering that the actual supporting structure which is "U"-shaped has an error in right angles during the processing, when the haptics substrate 1 vibrates on both sides of the equilibrium position, the vibration characteristics will be asymmetric. Therefore, the openings of all supporting structures 4 which are "U"-shaped can be oriented toward the periphery of the haptics panel, and the supporting structures 4 which are "U"-shaped can be symmetrically arranged along the central axis of the haptics substrate 1, so as to offset the vibration deviation caused by the right angle error.

In a possible implementation, in the above-mentioned haptics panel provided in an embodiment of the present disclosure, as shown in FIG. 7, FIG. 8, FIG. 12 and FIG. 13, the orthographic projections of the first connection structure 41 and the second connection structure 42 on the supporting substrate 2 do not overlap, and the supporting beam 43 connects the adjacent ends of the first connection structure 41 and the second connection structure 42 to form a "Z"-shaped supporting structure.

Figure 8:
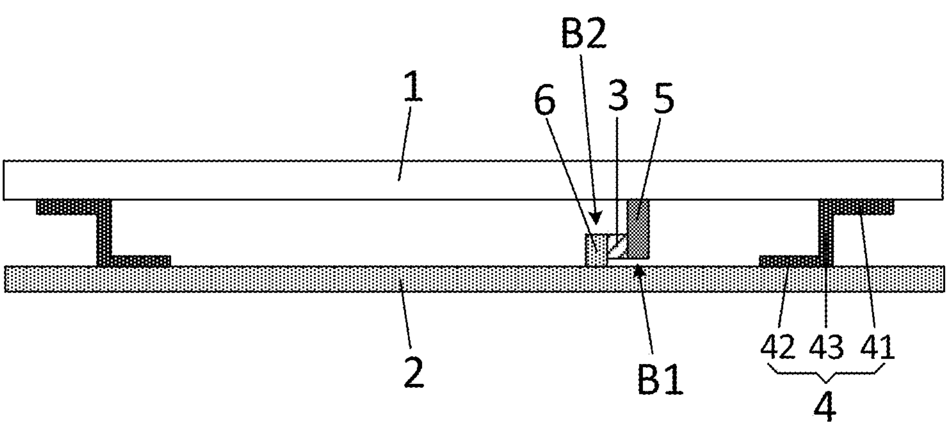
FIG. 8 is a cross-sectional view of the fifth haptics panel provided by embodiments of the present disclosure.
Figure 13:
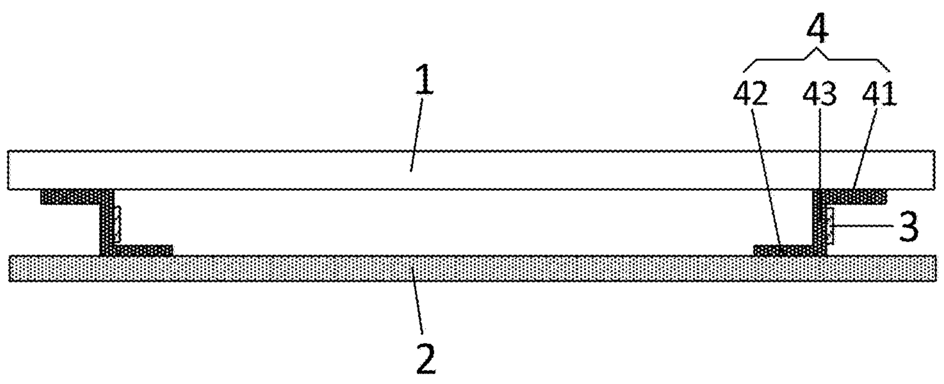
FIG. 13 is a cross-sectional view of the tenth haptics panel provided by embodiments of the present disclosure.

In a possible implementation, in the above-mentioned haptics panel provided in an embodiment of the present disclosure, as shown in FIG. 8 and FIG. 13, considering that the actual "Z"-shaped supporting structure 4 has a right angle error during processing, when the haptics substrate 1 vibrates on both sides of the equilibrium position, the vibration characteristics will be asymmetric. Therefore, the "Z"-shaped supporting structure 4 can be symmetrically arranged along the central axis of the haptics substrate 1, which can offset the vibration deviation caused by the right angle error.

In a possible implementation, in the above-mentioned haptics panel provided in the embodiment of the present disclosure, as shown in FIG. 4 to FIG. 13, when the cross-sectional shape of the supporting beam 43 along the thickness direction of the haptics substrate 1 is rectangular, the direction of the force applied by the exciter 3 during vibration is perpendicular to the long side of the rectangular cross-section of the supporting beam 43.

In a specific implementation, the cross-sectional shape of the supporting beam 43 along the thickness direction of the haptics substrate 1 may also be circular. In this case, the direction of the force applied by the exciter 3 during vibration may be any direction in a plane perpendicular to the axis of the supporting beam 43.

Of course, the cross-sectional shape of the supporting beam 43 of the supporting structure 4 can also be an irregular shape or any shape other than a rectangle or a circle. In this case, the direction of the force applied by the exciter 3 during vibration is the direction in which the bending stiffness of the supporting beam 43 is the smallest.

In a specific implementation, the haptics panel provided in the embodiment of the present disclosure, as shown in FIG. 4 to FIG. 13, further includes a touch layer (not shown) which is located on the side of the haptics substrate 1 facing away from the supporting substrate 2. By adopting a structure in which the haptics substrate and the touch layer are integrated, a touch function (such as determining a touch position) and a haptics reproduction function can be realized.

Of course, in addition to the various film layers mentioned above, the haptics panel may also be provided with other film layers according to practical applications.

In summary, the haptics panel provided in the embodiments of the present disclosure is suitable for the design of a supporting structure in a large-mass and large-size haptics panel, and the supporting structure can meet both rigid support and tactile design requirements.

The haptics panel provided by the embodiments of the present disclosure can be applied to the fields of medical treatment, automotive electronics, sports tracking systems, etc. It is particularly suitable for the field of wearable devices, medical external or implanted in the human body for monitoring and treatment, or applied to the fields of electronic skin for artificial intelligence. Specifically, the haptics panel can be applied to haptics panels that can generate vibration and mechanical properties, such as brake pads, keyboards, mobile terminals, game controllers, vehicles, smart homes, etc.

Figure 18:
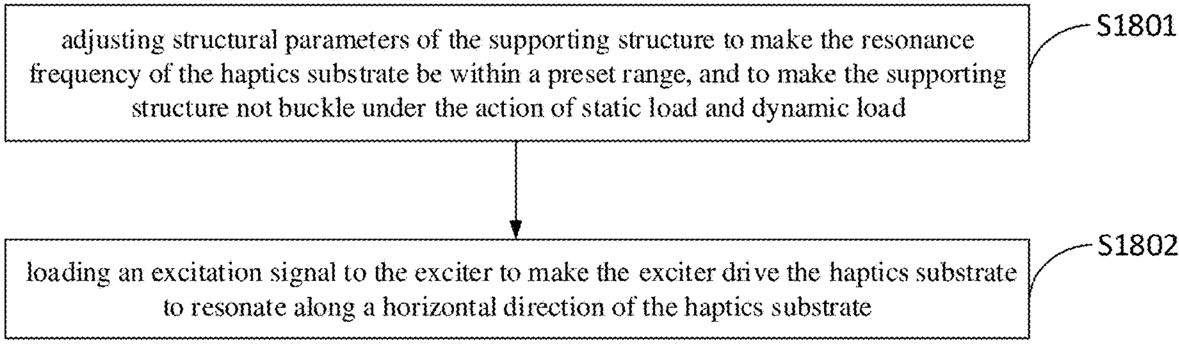
FIG. 18 is a schematic flow chart of a driving method for a haptics panel provided in an embodiment of the present disclosure.

Based on the same inventive concept, some embodiments of the present disclosure further provide a driving method of a haptics panel, which is used to drive the haptics panel provided by the embodiments of the present disclosure. As shown in FIG. 18, the driving method includes:

S1801, adjusting structural parameters of the supporting structure to make the resonance frequency of the haptics substrate be within a preset range, and to make the supporting structure not buckle under the action of static load and dynamic load;

S1802, loading an excitation signal to the exciter to make the exciter drive the haptics substrate to resonate along a horizontal direction of the haptics substrate.

The driving method of the haptics panel provided in the embodiment of the present disclosure can make the resonance frequency of the haptics substrate within 100 Hz to 300 Hz by reasonably designing the structural parameters of the supporting structure, and can make the supporting structure not buckle under the action of static load and dynamic load, so that the haptics panel can meet the requirements of the haptics design for vibration amplitude and acceleration under the condition of meeting the rigid design. Therefore, the embodiments of the present disclosure can realize that the supporting structure of the haptics panel with large mass and large size can meet the requirements of rigid support and haptics design at the same time.

In the specific implementation, in the above driving method provided by the embodiment of the present disclosure, adjusting the structural parameters of the supporting structure is specifically by adjusting the structural parameters of the supporting beam in the supporting structure. The adjusting the structural parameters of the supporting beam specifically includes at least one of the following:

adjusting the elastic modulus of the supporting beam, adjusting the moment of inertia of cross section of the supporting beam, and adjusting the height of the supporting beam.

The implementation of the above-mentioned driving method provided in the embodiment of the present disclosure can refer to the aforementioned haptics panel, in which the elastic modulus of the supporting beam, the moment of inertia of the cross section of the supporting beam, and the height of the supporting beam are adjusted to make the resonance frequency of the haptics substrate within a preset range, and the supporting beam does not buckle under the action of static load and dynamic load, so as to achieve that the supporting structure of the haptics panel with large mass and large size can meet the rigid support and haptics design requirements at the same time, which will not be repeated in the present disclosure.

Based on the same inventive concept, some embodiments of the present disclosure also provide a haptics apparatus, including the above-mentioned haptics panel provided in the embodiments of the present disclosure. Since the principle of solving the problem by the haptics apparatus is similar to that of the above-mentioned haptics panel, the implementation of the haptics apparatus can refer to the implementation of the above-mentioned haptics panel, and the repeated parts will be omitted. The haptics apparatus can be any product or component with display or touch function, such as a mobile phone, a tablet computer, a television, a monitor, a laptop computer, a digital photo frame, a navigator, etc.

In specific implementation, the haptics apparatus provided in the embodiments of the present disclosure may further include other film layers well known to those skilled in the art, which will not be described in detail herein.

In specific implementation, the haptics apparatus can determine the position of human touch, thereby generating corresponding vibration waveforms, amplitudes and frequencies, and realizing human-computer interaction. Of course, the haptics apparatus can also be applied to medical, automotive electronics, sports tracking systems and other fields according to actual needs, which will not be described in detail here.

The above-mentioned haptics panel and haptics apparatus provided by the embodiments of the present disclosure, by reasonably designing the structural parameters of the supporting structure, the resonance frequency of the haptics substrate is within a preset range, for example, the preset range is within the frequency range (100 Hz to 300 Hz) where the human body is most sensitive to vibration. In this way, the resonance frequency of the haptics substrate can effectively improve the haptics effect of the haptics panel based on the exciter excitation vibration in the low-frequency range. Further, by reasonably designing the structural parameters of the supporting structure, the supporting structure is made not to buckle under the action of static load and dynamic load at the same time, so that the haptics panel can meet the requirements of the haptics design for vibration amplitude and acceleration under the condition of meeting the rigid design. Therefore, the embodiments of the present disclosure can realize that the supporting structure of the haptics panel with large mass and large size can meet the requirements of rigid support and haptics design at the same time.

Although the preferred embodiments of the present disclosure have been described, those skilled in the art may make additional changes and modifications to these embodiments once they have learned the basic creative concept. Therefore, the appended claims are intended to be interpreted as including the preferred embodiments and all changes and modifications falling within the scope of the present disclosure.

Obviously, those skilled in the art can make various changes and modifications to the embodiments of the present disclosure without departing from the spirit and scope of the embodiments of the present disclosure. Thus, if these modifications and variations of the embodiments of the present disclosure fall within the scope of the claims of the present disclosure and their equivalents, the present disclosure is also intended to include these modifications and variations.

What is claimed is:

1. A haptics panel, comprising:

a haptics substrate;

a supporting substrate arranged opposite to the haptics substrate;

at least one exciter arranged between the haptics substrate and the supporting substrate, the exciter being configured to drive the haptics substrate to resonate along a horizontal direction of the haptics substrate;

at least one supporting structure arranged between the haptics substrate and the supporting substrate, wherein one end of the supporting structure is connected to the haptics substrate, and other end of the supporting structure is connected to the supporting substrate;

wherein structural parameters of the at least one supporting structure satisfy: a resonance frequency of the haptics substrate is within a preset range, and the at least one supporting structure does not buckle under an action of static load and dynamic load;

wherein the at least one supporting structure comprises:

a first connection structure fixed to a side of the haptics substrate facing the supporting substrate, a second connection structure fixed to a side of the supporting substrate facing the haptics substrate, and a supporting beam connecting the first connection structure and the second connection structure;

wherein the structural parameters of the at least one supporting structure are structural parameters of the supporting beam;

wherein the haptics panel further comprises:

a third connection structure fixedly connected to the side of the haptics substrate facing the supporting substrate, and a supporting portion fixedly connected to the side of the supporting substrate facing the haptics substrate;

wherein orthographic projections of the third connection structure and the supporting portion on the supporting substrate do not overlap; a first gap is provided between the third connection structure and the supporting substrate, a second gap is provided between the supporting portion and the haptics substrate, the exciter is fixed between the third connection structure and the supporting portion, and the exciter is not in contact with the haptics substrate and the supporting substrate.

2. The haptics panel according to claim 1, wherein the structural parameters of the supporting beam satisfy a following relationship:

$$\frac{\pi^2 EI}{(Kl)^2} > \text{mg}\cos\theta,$$

$$K = (1/n)\hat{}(1/2);$$

wherein E is an elastic modulus of the supporting beam, I is a moment of inertia of a cross section of the supporting beam, l is a height of the supporting beam, m is a mass of the haptics substrate carried by the at least one supporting structure, θ is a degree of an inclination angle of the haptics panel, and n is a constraint coefficient of the supporting beam, K is a boundary condition of the supporting beam, g is a gravitational acceleration.

3. The haptics panel according to claim 2, wherein n=4, or n=2, or n=0.5.

4. The haptics panel according to claim 1, wherein the structural parameters of the supporting beam satisfy a following relationship:

$$100\,\mathrm{Hz} < \frac{1}{2\pi}\sqrt{\frac{3EI}{l^3 * m}} < 300\,\mathrm{Hz};$$

wherein $$\frac{1}{2\pi}\sqrt{\frac{3EI}{l^3 * m}}$$

is the resonance frequency of the haptics substrate, E is an elastic modulus of the supporting beam, I is a moment of inertia of a cross section of the supporting beam, l is a height of the supporting beam, and m is a mass of the haptics substrate carried by the at least one supporting structure.

5. The haptics panel according to claim 1, wherein the supporting beam connects centers of the first connection structure and the second connection structure to form the at least one supporting structure which is "I"-shaped.

6. The haptics panel according to claim 1, wherein the supporting beam connects ends of the first connection structure and the second connection structure to form the at least one supporting structure which is "U"-shaped; an opening of the at least one supporting structure which is "U"-shaped faces toward a direction parallel to the haptics panel.

7. The haptics panel according to claim 6, wherein the opening of the at least one supporting structure which is "U"-shaped is toward a periphery of the haptics panel.

8. The haptics panel according to claim 1, wherein orthographic projections of the first connection structure and the second connection structure on the supporting substrate do not overlap, and the supporting beam connects adjacent ends of the first connection structure and the second connection structure to form the at least one supporting structure which is "Z"-shaped.

9. The haptics panel according to claim 5, wherein a cross-sectional shape of the supporting beam along a thickness direction of the haptics substrate is a rectangle or a circle.

10. The haptics panel according to claim 2, wherein four corners of the haptics substrate each is provided with one supporting structure.

11. The haptics panel according to claim 10, wherein a center of the haptics substrate is provided with one supporting structure.

12. The haptics panel according to claim 11, wherein any three positions on the haptics substrate are provided with three supporting structures, and the three supporting structures form three vertices of a triangle.

13. The haptics panel according to claim 10, wherein two supporting structures in an extension direction of a long side or a short side of the haptics substrate are symmetrically arranged.

14. The haptics panel according to claim 1, wherein the exciter is fixed to a side of the supporting beam.

15. The haptics panel according to claim 1, wherein a material of the supporting structure comprises metal or stainless steel.

16. The haptics panel according to claim 1, wherein the exciter is a piezoelectric film structure, a piezoelectric ceramic block structure or a linear motor.

17. The haptics panel according to claim 1, further comprising a touch layer located on a side of the haptics substrate facing away from the supporting substrate.

18. A haptics apparatus, comprising the haptics panel according to claim 1.

* * * * *